United States Patent
Bovaird et al.

[19]

[11] Patent Number: 6,093,313

[45] Date of Patent: *Jul. 25, 2000

[54] MULTIPLE DISCHARGE WATER FAUCET WITH SELF-CONTAINED FILTER

[75] Inventors: Raymond Bovaird, Hudson; James J. Sposit, Parma; W. Randall Tucker, Oberlin, all of Ohio

[73] Assignee: Moen Incorporated, North Olmsted, Ohio

[ * ] Notice: This patent is subject to a terminal disclaimer.

[21] Appl. No.: 09/207,813

[22] Filed: Dec. 9, 1998

Related U.S. Application Data

[63] Continuation-in-part of application No. 08/761,351, Dec. 6, 1996, Pat. No. 5,858,215.

[51] Int. Cl.7 ............................ B01D 17/12; B01D 35/04

[52] U.S. Cl. ............................ 210/94; 137/551; 137/801; 210/424; 210/433.1; 210/440; 210/449

[58] Field of Search .................................. 210/85, 91, 94, 210/282, 320, 324, 440, 443, 449, 460, 420, 424, 433.1; 137/551, 614.2, 801

[56] References Cited

U.S. PATENT DOCUMENTS

| | | |
|---|---|---|
| 712,868 | 11/1902 | Traxton . |
| 738,486 | 9/1903 | Rogers . |
| 816,517 | 3/1906 | Whalen . |
| 1,835,865 | 12/1931 | Hansen . |
| 2,334,791 | 11/1943 | Roffy . |
| 3,637,083 | 1/1972 | Rosaen . |
| 3,722,800 | 3/1973 | Shames et al. . |
| 3,743,188 | 7/1973 | Wagner . |
| 3,853,761 | 12/1974 | McClory ................................ 210/449 |
| 4,107,046 | 8/1978 | Corder . |
| 4,172,796 | 10/1979 | Corder ................................... 210/424 |
| 4,242,201 | 12/1980 | Stephens et al. . |
| 4,770,768 | 9/1988 | Lang ....................................... 210/424 |
| 4,863,103 | 9/1989 | Gannaway . |
| 4,982,900 | 1/1991 | Blake . |
| 5,008,011 | 4/1991 | Underwood . |
| 5,017,286 | 5/1991 | Heligman ................................ 210/424 |
| 5,020,569 | 6/1991 | Agresta . |
| 5,145,083 | 9/1992 | Takahashi . |
| 5,152,464 | 10/1992 | Farley . |
| 5,171,429 | 12/1992 | Yasuo . |
| 5,279,329 | 1/1994 | Pippel . |
| 5,370,314 | 12/1994 | Gebauer et al. . |
| 5,385,667 | 1/1995 | Steger . |
| 5,858,215 | 1/1999 | Burchard et al. ........................ 210/87 |
| 5,935,426 | 8/1999 | Giordano et al. ....................... 210/449 |
| 5,976,362 | 11/1999 | Wadsworth et al. ..................... 210/94 |
| 5,989,425 | 11/1999 | Yonezawa et al. ..................... 210/424 |

FOREIGN PATENT DOCUMENTS

| | | |
|---|---|---|
| 0 672 443 | 9/1995 | European Pat. Off. . |
| 0 844 339 | 5/1998 | European Pat. Off. . |
| 3-154685 | 7/1991 | Japan . |
| 4-216729 | 8/1992 | Japan . |
| 5-212376 | 8/1993 | Japan . |
| 6-63548 | 3/1994 | Japan . |
| 7-132282 | 5/1995 | Japan . |
| 8-215093 | 8/1996 | Japan . |
| 10-5632 | 1/1998 | Japan . |
| Y2-63-2146 | 1/1998 | Japan . |

*Primary Examiner*—Joseph W. Drodge
*Attorney, Agent, or Firm*—McEachran, Jambor, Keating, Bock & Kurtz

[57] ABSTRACT

A faucet with multiple water discharges includes a housing, an input water connection for said housing, an unfiltered water discharge and a filtered water discharge. There is a water filter within the housing and a valve within the housing which is connected to each water discharge. There is an unfiltered water flow path from the input water connection to the valve and a filtered water flow path from the input water connection, through the filter, to the valve. A manual control element, accessible from the exterior of the housing, operates the valve to direct filtered water to the filtered water discharge and unfiltered water to the unfiltered water discharge. There is an electrical circuit positioned within the housing. The circuit includes a display and the circuit is responsive to operation of the manual control to cause the circuit to operate the display only during the discharge of filtered water.

24 Claims, 3 Drawing Sheets

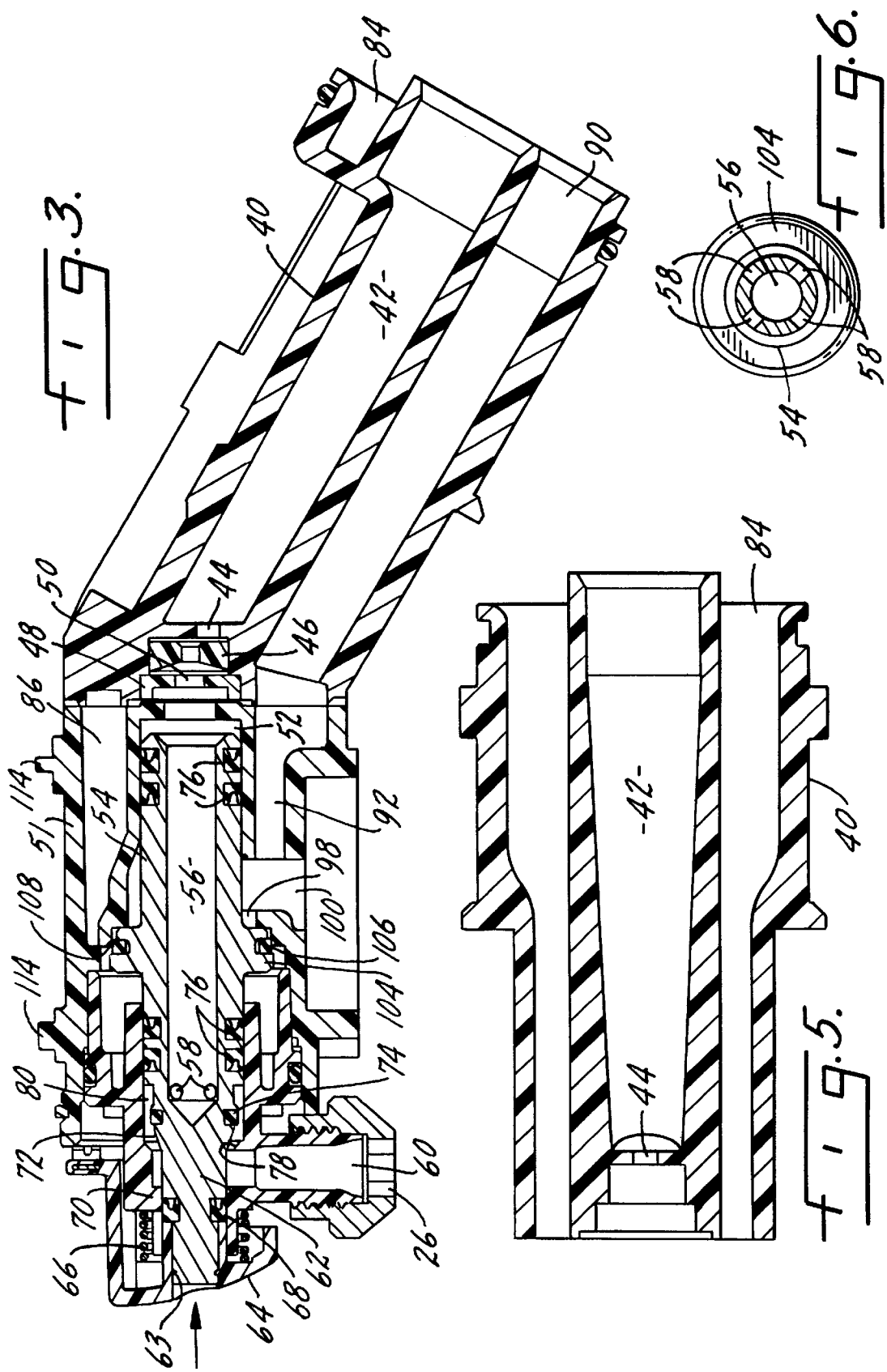

MULTIPLE DISCHARGE WATER FAUCET WITH SELF-CONTAINED FILTER

This application is a continuation-in-part of application Ser. No. 08/761,351, filed on Dec. 6, 1996, now U.S. Pat. No. 5,858,215.

THE FIELD OF THE INVENTION

The present invention relates to faucets having an integral water filter. Although the invention will be described in connection with faucets of the type customarily found in a kitchen environment, and which have multiple water discharges, it has wider application. The faucet may have an elongated spout with a stream discharge and a filtered water discharge. The invention is equally applicable to a faucet wand which may be removed from the base and directed at any portion of the sink. The faucet includes a filter to provide filtered water for the filtered water discharge. The filter may be formed of carbon granules and is positioned within the faucet housing and forms a portion of the water flow path from an input hose connection to the described multiple water discharges.

The faucet includes a simply constructed, reliable valve element movable in response to a manual control accessible from the exterior of the faucet. The movable manual control is spring-biased to a position in which it normally closes the filtered water flow path. Operation of the manual control moves the valve element to a position in which it opens the filtered water flow path and closes the unfiltered water flow path. The valve element will remain in such a position, due to water pressure, until the water is turned off and the valve element is returned by the spring to its normal position.

The faucet includes a visual readout indicative of filter condition and operable only at such times as the water is flowing through the filtered water discharge. The display includes two light emitting diodes, each of a different color. Either one of the light emitting diodes may be operated by the electrical circuit forming a part of the faucet, or both such light emitting diodes may be simultaneously operated, with the result that the display provides a readout of three different colors indicative of the filter condition and of a need to replace the filter.

SUMMARY OF THE INVENTION

The present invention relates to faucets for use in a kitchen environment and particularly to a faucet which provides both a filtered water discharge and an unfiltered water discharge.

A primary purpose of the invention is a faucet as described which has an integral water filter and a display for indicating filter condition.

Another purpose is a faucet as described in which the display includes a pair of light emitting diodes, each of a different color, and related circuit elements capable of displaying either one or both of the LEDs to provide three different indications of filter condition.

Another purpose is a faucet as described including a reliable, simply constructed control valve which functions to direct water to either the filtered water discharge or the unfiltered water discharge.

Another purpose is a faucet as described in which the control valve includes a valve element, which will close the unfiltered water flow path in response to a manual control button and will remain in such a closed position until the water is turned off.

Another purpose of the invention is to provide a faucet having both a filtered water and unfiltered water discharge and an integral water filter, with the filtered water flow path being exteriorly of the filter and the filtered water flow path being within the water filter.

Another purpose of the invention is a faucet as described which will not function as designed unless a filter is correctly installed.

Another purpose of the invention is a filter for the use described which includes a plug normally closing a part of the unfiltered water flow path.

Other purposes will appear in the ensuing specification, drawings and claims.

BRIEF DESCRIPTION OF THE DRAWINGS

The invention is illustrated diagrammatically in the following drawings wherein:

FIG. 3 is an enlarged section of the head valve;

FIG. 4 is an end view of the main valve body;

FIG. 5 is a section of the main valve body along plane 5—5 of FIG. 4;

FIG. 6 is a section of the valve spool indicating the filtered water outlet holes; and FIG. 7 is a schematic diagram of the display circuit.

DESCRIPTION OF THE PREFERRED EMBODIMENT

The present invention will be described in connection with a kitchen faucet and one which has an elongated spout extending over the recessed water chambers of the sink. The concepts of the invention are equally applicable to a pullout wand which is currently common in kitchen faucets.

Figure 1:
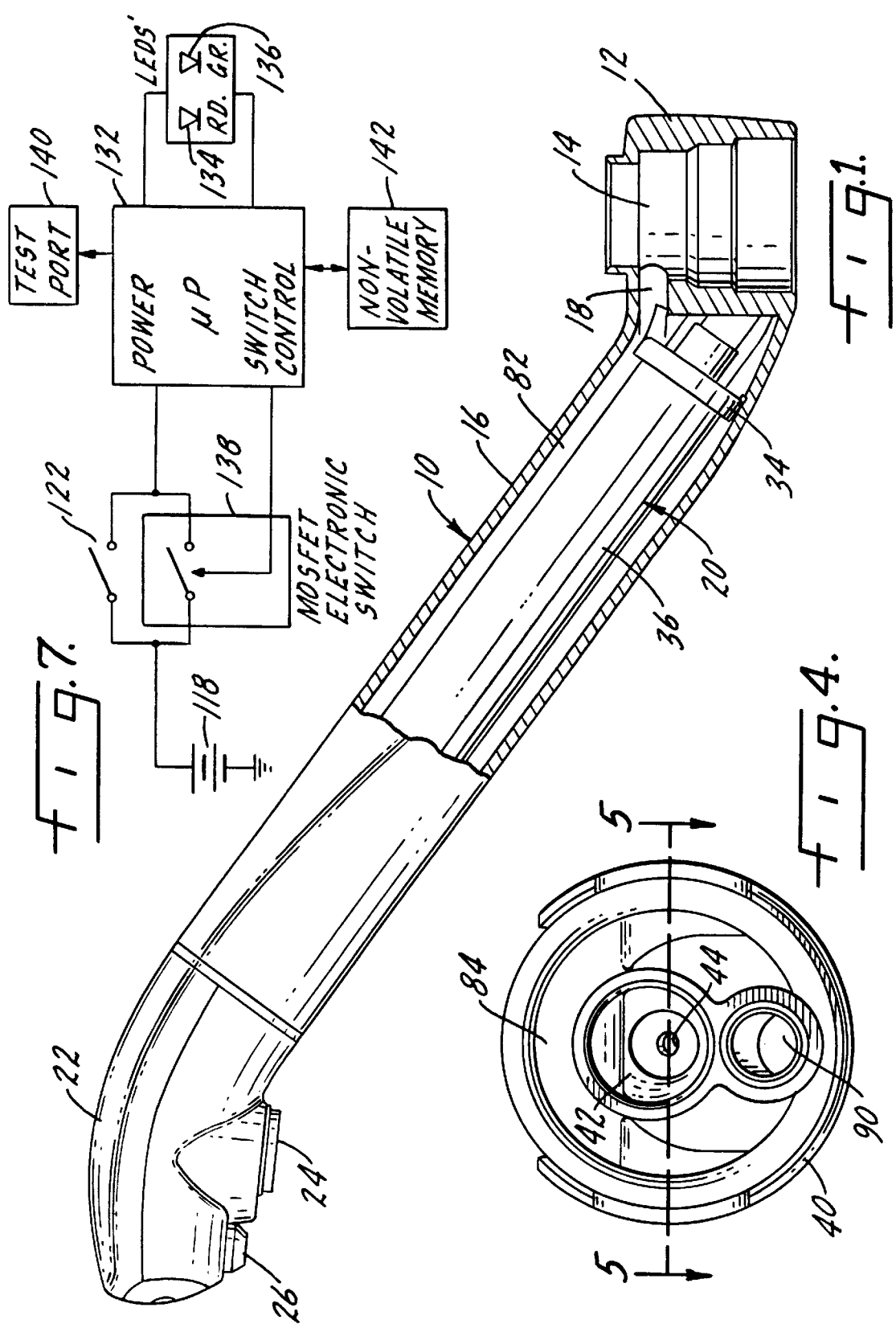
FIG. 1 is a side view of the spout assembly, in part section.

In FIG. 1, the faucet has an outer housing 10 which may be formed of multiple housing sections, some of which may be sonically welded into a unitary body. The housing 10 has a hub 12 which will be mounted to the sink deck and has a cavity 14 within which will be positioned a control valve for providing hot and cold water to the filtered water control valve in the spout. A handle will be positioned on top of the hub 12 for manipulation of the valve element positioned within the cavity 14. Water from the cavity 14 will enter an elongated tubular portion 16 of the housing 10 through an inlet port 18.

Positioned within the tubular portion 16 of the housing 10 is a water filter 20 which may conveniently contain carbon granules or any other suitable filter media which is effective to remove the desired impurities from the water and provide suitably filtered drinking water for the filtered water discharge. The housing 10 includes a head 22 having a stream discharge 24 directed downwardly toward the sink and a filtered water discharge 26, again directed downwardly toward the sink. In the preferred embodiment of the invention, the head 22 may be manually removed relative to the tubular portion 16 so as to provide access to change the filter 20 when it is time for renewal.

Figure 2:
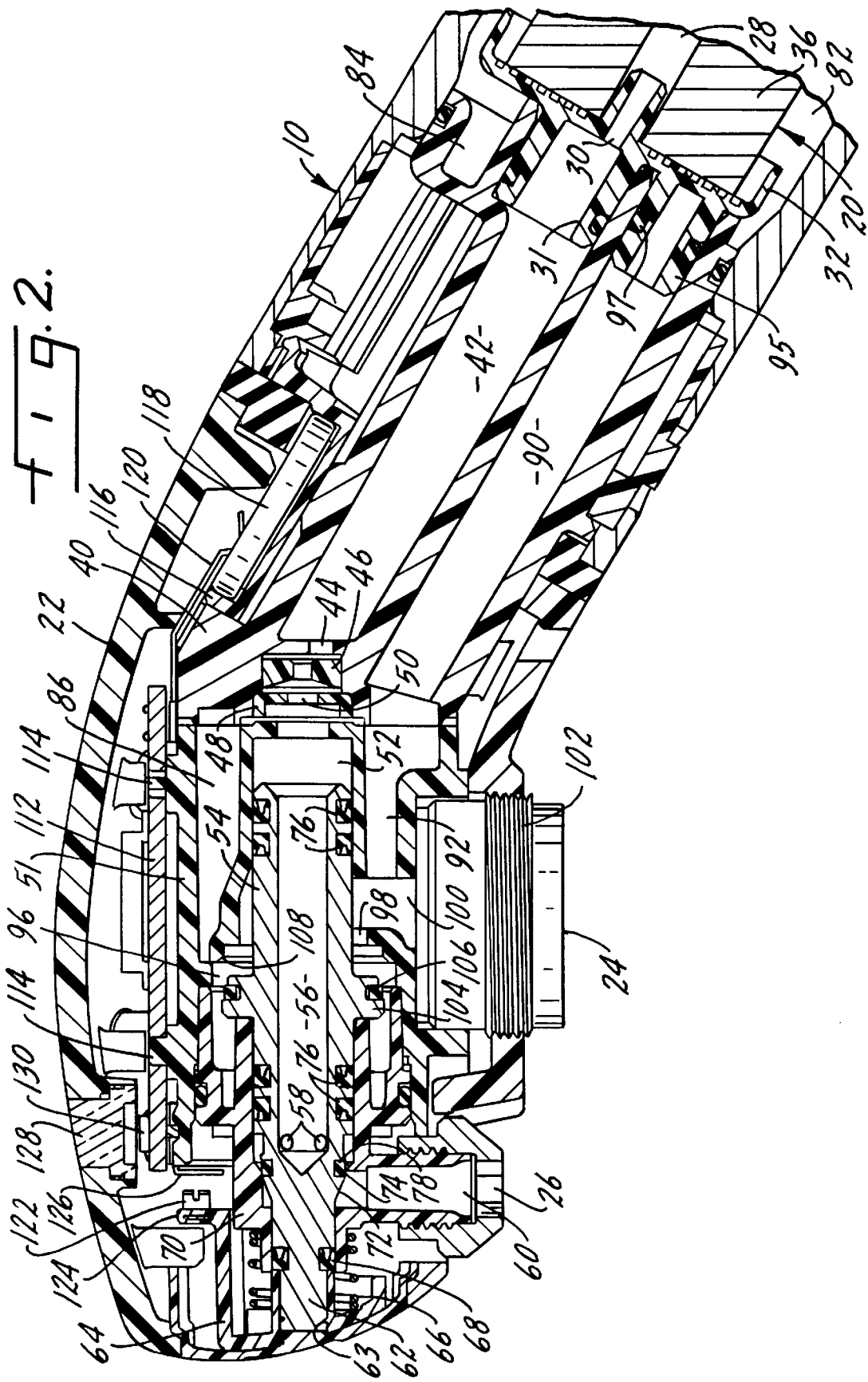
FIG. 2 is an enlarged vertical section of the spout head assembly.

As clearly shown in FIGS. 1 and 2, water entering the tubular portion 16 through the port 18 will flow about the exterior of the filter 20. A portion of that water will flow through the filter 20 into a filtered water flow path conduit 28 and then through a passage 30 in a filter outlet cap 32. The cap 32 is an integral part of the filter, as is the input cap 34, illustrated in FIG. 1, with the input and output caps together holding the filter block 36 into a single unitary replaceable filter.

FIGS. 2, 3, 4, 5 and 6 illustrate the details of the faucet head 22 and the valve mechanism which controls the flow of filtered water and unfiltered water to the respective discharges 26 and 24. Positioned within the head 22 is a valve body 40 which has a tubular passage 42 in communication with the filtered water outlet 30 of end cap 32 through a sealed filter projection 31. Passage 42 has an outlet 44 which is in communication with a flow restrictor 46 which will limit the flow of filtered water through the faucet. The outlet 44 is not in axial alignment with flow restrictor 46, with such an off axis relationship providing flow dynamics that quiets water flow through the faucet. A flow retainer 48 holds the flow restrictor in position and has an opening 50 which communicates with the flow restrictor and with a cavity 52 in the valve body front 51. A reciprocally movable valve element 54 is positioned in cavity 52. Thus, filtered water from the filtered water flow path passageway 28 will pass through the described passages into the cavity 52 and into an interior chamber 56 of the valve element 54. The chamber 56 has a plurality of openings 58 which, in the FIG. 2 position, are blocked from discharging filtered water into a filtered water passageway 60 which communicates with the filtered water discharge 26. The valve element 54 has a head 62 which is attached by a snap-on connection 63 to a button 64 forming the manual operator for effecting a discharge of filtered water from the faucet. A coil spring 66 biases the button 64 and, thus the valve element 54, toward the default or release position shown in FIG. 2.

The valve element 54 has a seal 68 surrounding its head which seals against a portion 70 of the valve body front 51. The head 62 has a tapered portion 72 which directly overlies the passage 60, in the FIG. 2 position, and there is a seal ring 74 at the junction of the tapered portion 72 and the larger body portion of the valve element 54. In the FIG. 2 position the seal 74 prevents filtered water from within chamber 56 from flowing through the openings 58 and reaching the filtered water discharge passage 60. The valve element 54 may have a plurality of seals 76, which may be quad seals, which seals extend about its periphery and are in sealing contact with portions of the valve body front 51 to prevent leakage of filtered water from outside of the valve element 54.

FIG. 3 illustrates the position of the valve when the button 64 has been depressed to provide for filtered water discharge. Note that the valve element 54 has been moved inwardly, compressing spring 66, with the result that seal 74 has moved away from a surface 78 on the valve body portion 70 so as to open communication between the openings 58 and a chamber 80 within the valve body portion 70 and exteriorly of the valve element 54. Thus, filtered water can now flow from chamber 56 through the openings 58 into the chamber 80 and then down through the filtered water passage 60 to the filtered water discharge 26. As will be described hereinafter, the faucet will remain in a filtered water discharge position, once the valve element has been moved to the FIG. 3 position, until water is shut off.

The path for unfiltered water begins at the exterior of the filter, in a cylindrical passageway 82, which is outside of the filter and within the tubular portion 16 of the faucet housing. Water will flow from passage 82 into a cylindrical passage 84 in the valve body 40. From passage 84 water flows into a cavity 86 which is on the exterior of the valve body front 51. From cavity 86 the water flows into an annular recess 96 and then through a circumferential opening 98 to passage 100 which is directly above the aerator 102 forming the unfiltered water discharge 24.

FIG. 2 illustrates the normal position of the faucet when there is no operation of the button 64 to provide for a filtered water discharge. Water will flow through the described passageways, cavities, recesses and chambers until it reaches the aerator 102.

When button 64 is pressed, moving the valve element 54 from the FIG. 2 position to the FIG. 3 position, a land 104 having a seal ring 106 is moved so that the seal contacts a tapered surface 108 on a portion of the valve front 51, shutting off the flow of water through passage 98 and to the aerator 102.

When the valve has moved to this position, unfiltered water within the annular cavity 86 will exert pressure against land 104 and seal 106 which will hold the valve element in the FIG. 3 position. The pressure exerted by the water is sufficient to overcome the return force of spring 66. Thus, the faucet will remain in the filtered water position until it is turned off, at which time the return spring 66 will move the valve element back to the FIG. 2 unfiltered water discharge position, since there is no longer pressure to hold the valve element in the FIG. 3 or filtered water position.

Filter end cap 32 has a cylindrical projection or plug 95 which is of a size and shape to be positioned within a passage 90 in valve body 40. Passage 90 connects with a passage 92 in valve body front 51, with passage 92 connecting to aerator 102 through passage 100. If a filter is positioned within the faucet, no unfiltered water will flow from the cylindrical passage 82 outside of the filter to passage 90 and thus to the unfiltered water discharge 24. Plug 95 and its seal 97 prevent such flow. However, if no filter is present, unfiltered water will follow this flow path, and if button 64 is operated, unfiltered water will flow from both stream discharge 24 and filtered water discharge 26. When button 64 is released, there will be no filtered water flow, but unfiltered water will continue to be discharged. Since this is not normal operation of the faucet, it will alert the user that no filter is within the faucet.

There is a printed circuit board 112 which is mounted onto projections 114 on the exterior of the valve body front 51, with the printed circuit board holding the circuit elements illustrated in FIG. 7. There is a battery tray 116 which holds a battery 118 which is connected by a contact 120 to the printed circuit board 112. There is a second contact for the battery which is not shown. A switch 122 is mounted on an extending arm 124 of the button 64 and is positioned to close upon a contact 126 when the button is moved from the FIG. 2 position to the filtered water position of FIG. 3. Closure of switch 124 on contact 126 will connect battery power to the printed circuit board to illuminate the light emitting diodes powered by the battery. There is a light pipe 128 directly in alignment with a pair of light emitting diodes 130. The diodes will be illuminated under certain prescribed conditions, depending upon the remaining life of the filter.

The circuit of FIG. 7 includes a microprocessor 132 having an output connected to a red LED 134 and a green LED 136. The microprocessor receives power from battery 118 when the momentary mechanical switch 122 is closed. The microprocessor connection to battery power is maintained by a MOSFET switch 138 which is in parallel with switch 122 and which will be engaged as soon as the mechanical switch 122 applies battery power to the microprocessor. The use of the parallel combination of a MOSFET switch and a mechanical switch is effective to extend battery life. As soon as the mechanical switch 122 is closed, MOSFET switch 138 will be closed and the microprocessor 132 will determine when the MOSFET switch will be open. Thus, the time of application of power is determined by the microprocessor and not by the application of the mechanical switch. Also connected to microprocessor 132 is a test port 140 and a non-volatile memory 142. The microprocessor 132, in addition to controlling circuit operation, provides data storage relative to use of the faucet filter. Such data may include the available life of the filter currently in use, the number of switch activations to provide a filtered water discharge, and the usage of prior filters within that specific faucet.

The circuit of FIG. 7 is effective to selectively activate the red and green LEDs 134 and 136 to indicate filter condition. The microprocessor will control the illumination of the LEDs and it is only operable when the mechanical switch 122 is initially closed by activation of button 64. Thus, the display will only be illuminated when filtered water is being discharged by the faucet. Whenever the circuit is activated as described, filter use and thus remaining filter life, is determined by a measurement of the time that the microprocessor is powered. The microprocessor accumulates the total time that it is powered and this accumulation of time will provide an indication of remaining filter life.

As an example of one operating method, and assuming that the filter has a capacity of 200 gals. and that this is represented by 400 mins. of usable filter life, when the filter is initially inserted into the faucet, and the button 64 is operated, both green and red LEDs 136 and 134 will be active, providing a yellow display signal from the light pipe 128 for a period of five minutes. This will be an alternating display, as it will pulse between a pure green display and a yellow display when both LEDs are activated. After the first five minutes, subsequent activation of the display will have only a pulsing green display from LED 136, as it will be the only LED powered by the microprocessor. This condition will prevail, whenever the filter is operated, until there is a remaining filter life of 32 mins. At this time and for the next 16 mins. of filter use, both red LED 134 and green LED 136 will be pulsed when the display is operative. When 16 mins. of filter life remain, and the display is powered, only the red LED 134 will be pulsed. This condition will remain, until there are zero minutes of filter life remaining, after which any activation of the filter will result in a more rapidly pulsing red display.

The above is only an example of a possible sequence of displays from the filter. What is important is that the filter only be operable when there is a filter water discharge, to limit battery usage, and that the filter readily provide to the user an indication of remaining filter life.

Whereas the preferred form of the invention has been shown and described herein, it should be realized that there may be many modifications, substitutions and alterations thereto.

The embodiments of the invention in which an exclusive property or privilege is claimed are defined as follows:

1. A faucet having multiple water discharges including a housing, an input water connection for said housing, unfiltered water discharge means on said housing, filtered water discharge means on said housing, a water filter within said housing, valve means in said housing connected to each of said water discharges, an unfiltered water flow path from said input water connection to said valve means, a filtered water flow path from said input water connection, through said filter, to said valve means, filtered water manual control means accessible from the exterior of said housing for operating said valve means to direct filtered water to said filtered water discharge means and to prevent the flow of unfiltered water to said unfiltered water discharge means, and an electrical circuit positioned within said housing, and filtered water display means on said housing connected to said circuit, said circuit including means responsive to operation of said water manual control means to cause said circuit to operate said display means during discharge of filtered water.

2. The faucet of claim 1 wherein said valve means includes a valve element, movable by said water manual control means, and located within said unfiltered water flow path and said filtered water flow path.

3. The faucet of claim 2 wherein said valve element has a portion thereof within said unfiltered water flow path which closes said unfiltered water flow path when said valve element is moved by said manual control means.

4. The faucet of claim 3 wherein said valve element portion has a pressure surface thereon, subject to water flowing within said unfiltered water flow path, which pressure surface is effective to maintain said valve element in position to close said unfiltered water flow path upon operation of and subsequent release of said water manual control means.

5. The faucet of claim 4 including spring means urging said valve element toward a position in which it normally closes said filtered water flow path.

6. The faucet of claim 5 in which said spring means extends about said valve element.

7. The faucet of claim 4 wherein said filtered water flow path extends within said valve element and said unfiltered water flow path extends about said valve element.

8. The faucet of claim 7 wherein said valve element includes a chamber, said chamber being within said filtered water flow path.

9. The faucet of claim 8 including a flow restrictor positioned within said filtered water flow path.

10. The faucet of claim 9 wherein said flow restrictor has an opening, with said opening being axially offset from said filtered water flow path.

11. The faucet of claim 1 wherein said electrical circuit includes a switch and a battery, closure of said switch connecting said battery and said display means, operation of said water manual control means closing said switch.

12. The faucet of claim 1 wherein said display means includes a pair of LEDs, each emitting light of a different color.

13. The faucet of claim 12 wherein said circuit includes means for applying battery power to either one or both of said LEDs to provide display means of three different colors.

14. The faucet of claim 1 wherein said unfiltered water flow path extends about the exterior of said water filter, with said filtered water flow path being through said water filter.

15. The faucet of claim 14 wherein said valve means includes two flow paths for unfiltered water from the exterior of said water filter to said unfiltered water discharge means, said filter including a plug, normally closing one of said unfiltered water flow paths.

16. A faucet including an elongate housing having an inlet end and a discharge end, a water filter within said housing, an input water connection for said housing at said inlet end, a filtered water discharge on said housing, an unfiltered water discharge on said housing, said discharges being located at said housing discharge end, an unfiltered water flow path from said input water connection to said unfiltered water discharge, a filtered water flow path from said input water connection to said filtered water discharge, valve means within said housing and located within each of said water flow paths, water manual control means accessible from the exterior of said housing for controlling said valve means to direct water to one of said filtered water discharge or said unfiltered water discharge, said valve means including a valve element, movable by said water manual control means and located within said unfiltered water flow path and said filtered water flow path, said valve element having a pressure surface thereon, subject to water flowing within said unfiltered water flow path, which pressure surface is effective to hold said valve element in a position closing said unfiltered water flow path upon operation of said water manual control means to direct water through said filtered water flow path and to hold said valve element in a position closing said unfiltered water flow path upon release of said water manual control means.

17. The faucet of claim 16 including spring means urging said valve element toward a position in which it normally closes said filtered water flow path.

18. The faucet of claim 17 in which said spring means is a coiled spring extending about said valve element.

19. The faucet of claim 18 wherein said filtered water flow path extends within said valve element and said unfiltered water flow path extends about said valve element.

20. The faucet of claim 19 wherein said valve element includes a chamber, said chamber being positioned within said filtered water flow path, water passages in said valve element connecting said chamber and said filtered water discharge means.

21. The faucet of claim 20 including a flow restrictor in said filtered water flow path.

22. The faucet of claim 16 wherein said unfiltered water flow path extends about the periphery of said filter, with said filtered water flow path extending through said filter.

23. The faucet of claim 22 wherein said valve means includes two flow paths for unfiltered water from the exterior of said water filter to said unfiltered water discharge means, said filter including a plug, normally closing one of said unfiltered water flow paths.

24. The faucet of claim 16 wherein said water manual control means is adjacent the discharge end of said elongate housing.

* * * * *

UNITED STATES PATENT AND TRADEMARK OFFICE
CERTIFICATE OF CORRECTION

PATENT NO. : 6,093,313
DATED : 07/25/00
INVENTOR(S) : Raymond Bovaird et al

It is certified that error appears in the above-identified patent and that said Letters Patent are hereby corrected as shown below: On the title page: Item [75]
The inventors are:

Gregory Hunter, Dover, MA
Kevin M. Johnson, Natick, MA
Douglas W. Kroncke, Boston, MA
Raymond Bovaird, Hudson, OH
James J. Sposit, Parma, OH
W. Randall Tucker, Oberlin, OH
Stuart D. Perry, Wellesley Hills, MA Signed and Sealed this Third Day of April, 2001

*Attest:*

NICHOLAS P. GODICI

*Attesting Officer*     Acting Director of the United States Patent and Trademark Office